(12) United States Patent
Peng

(10) Patent No.: US 7,737,588 B2
(45) Date of Patent: Jun. 15, 2010

(54) THREE-PHASE INDUCTION MOTOR

(76) Inventor: Huan-Yau Peng, No. 2, Alley 67, Lane 455, Section 3, Yen Ping Road, Hsin-Chu City (TW)

( * ) Notice: Subject to any disclaimer, the term of this patent is extended or adjusted under 35 U.S.C. 154(b) by 344 days.

(21) Appl. No.: 11/652,054

(22) Filed: Jan. 11, 2007

(65) Prior Publication Data
US 2007/0176522 A1 Aug. 2, 2007

(30) Foreign Application Priority Data
Jan. 27, 2006 (TW) .............................. 95201922 U

(51) Int. Cl.
*H02K 17/00* (2006.01)
*A61H 23/00* (2006.01)
(52) U.S. Cl. .............................. 310/81; 310/166; 601/70
(58) Field of Classification Search .................. 310/81, 310/166, 169; 340/384–385, 388.1, 407.1; 381/301, 396; 601/23–24, 26–32, 49, 57, 601/70
See application file for complete search history.

(56) References Cited

U.S. PATENT DOCUMENTS

| | | | | |
|---|---|---|---|---|
| 2,235,183 | A | | 3/1941 | Wettlaufer |
| 2,498,977 | A | | 2/1950 | Bertholin |
| 2,688,102 | A | * | 8/1954 | Jackson ........................ 310/81 |
| 2,945,970 | A | * | 7/1960 | Nordegren .................... 310/81 |
| 3,919,575 | A | * | 11/1975 | Weber et al. .................. 310/81 |
| 4,172,986 | A | * | 10/1979 | Iwaide .......................... 310/81 |
| 4,570,616 | A | | 2/1986 | Kunz |
| 6,084,327 | A | * | 7/2000 | Steffen ......................... 310/81 |
| 6,375,630 | B1 | | 4/2002 | Cutler |
| 6,440,092 | B1 | | 8/2002 | Leventhal |
| 7,563,235 | B2 | | 7/2009 | Van Der Meer |

FOREIGN PATENT DOCUMENTS

JP 04096640 A * 3/1992

* cited by examiner

*Primary Examiner*—Tran N Nguyen
(74) *Attorney, Agent, or Firm*—Abe Hershkovitz; Harold L. Novick; Hershkovitz & Associates, LLC

(57) ABSTRACT

The preferred embodiment the invention proposes pertains to a three-phase induction motor, and operates on the premises of having the extension cords on two ends of the motor embedded with several balancing eccentric washers and a balancing eccentric block added, of which the eccentric block contains a sleeve bearing, and one end of the eccentric block is fitted with a bolt, with the bolt head covered with rubber; o-ring is fitted between the balancing eccentric washer and balancing eccentric block, whereby using the invention's frequency changer for controlling an AC 3-phase induction motor serves to generate multiple frequencies for generating different amplitudes, which can be use to control the speed and load emitted between the eccentric block and balancing eccentric washer.

5 Claims, 4 Drawing Sheets

THREE-PHASE INDUCTION MOTOR

FIELD OF THE INVENTION

The preferred embodiment the invention proposes pertains to an induction motor, which is primarily comprised of the components of an AC three-phase induction motor, an eccentric washer, and an eccentric block, particularly referring to a three-phase inductor that is controlled by a frequency changer.

BACKGROUND OF THE INVENTION

As conventional vibrators often have the speed controlled through the PCB of a DC motor, which when adopted in vibrator only serves to generate an up-down vibration that not only offers limited strength but also falls short of satisfying the consumer's diverse demands, where a DC motor not only needs to put through a commutator for current regulation, but the process is also deemed inconvenient and cost ineffective.

SUMMARY OF THE INVENTION

The invention proposes a three-phase induction motor, which primarily entails having several balancing eccentric washers and a balancing eccentric block embedded in the extension shaft on the two ends of a three-phase induction motor, wherein as the frequency changer controls the AC three-phase induction motor to generate more frequencies, the same frequency is now capable of producing higher load and lower load, which enable the eccentric washers and eccentric block to generate a spin-off force, and in turn achieves the objective of converting for different speeds and loads.

DESCRIPTION OF THE PREFERRED EMBODIMENT

The invention proposes a three-phase induction motor, which primarily entails having several balancing eccentric washers and a balancing eccentric block embedded in the extension shaft on the two ends of a three-phase induction motor, wherein as the frequency changer controls the AC three-phase induction motor to generate more frequencies, the same frequency is now capable of producing higher load and lower load, which enable the eccentric washers and eccentric block to generate a spin-off force, and in turn achieves the objective of converting for different speeds and loads. As an alternative, connecting two similar AC motors in series to power the rotating speed and load the vibration spins off not only serves to generate varied strengths to satisfy the customer's demands but also helps to reduce the production cost.

EXAMPLE

Figure 1:
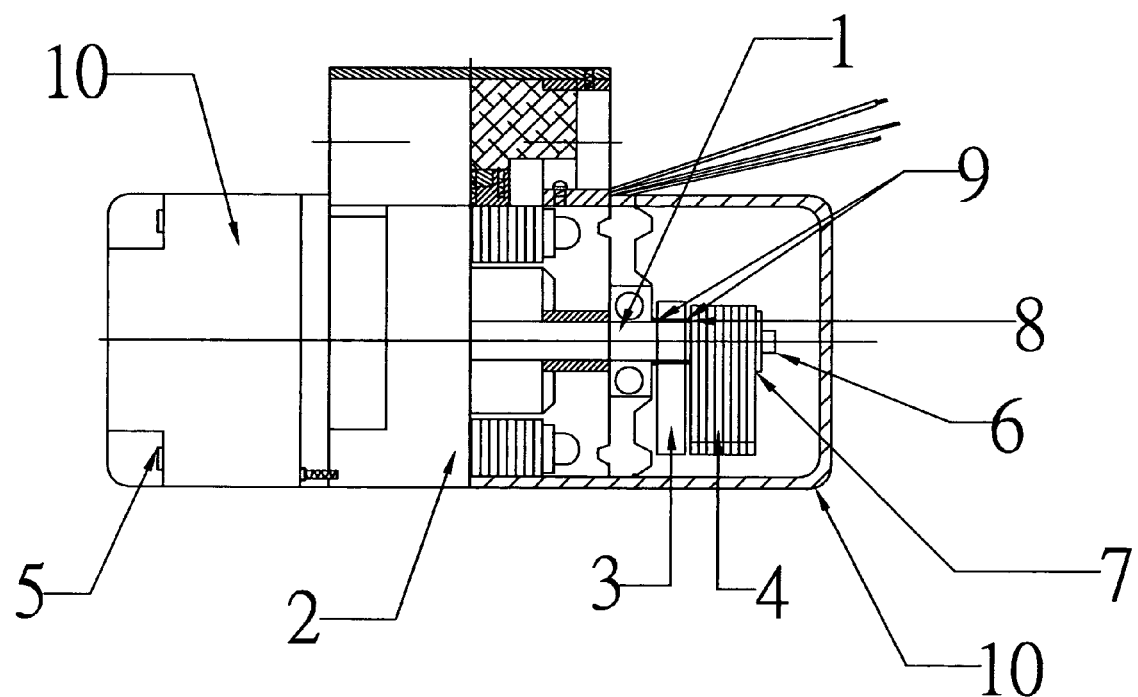
FIG. 1 is a cross-sectional view of an AC three-phase induction motor; a prior art connector depicting terminal pins of a common LED in the connector, the pins having been bent into a shape for SMD soldering; is a front elevational view of a prior art connector having a common LED.
Figure 1A:
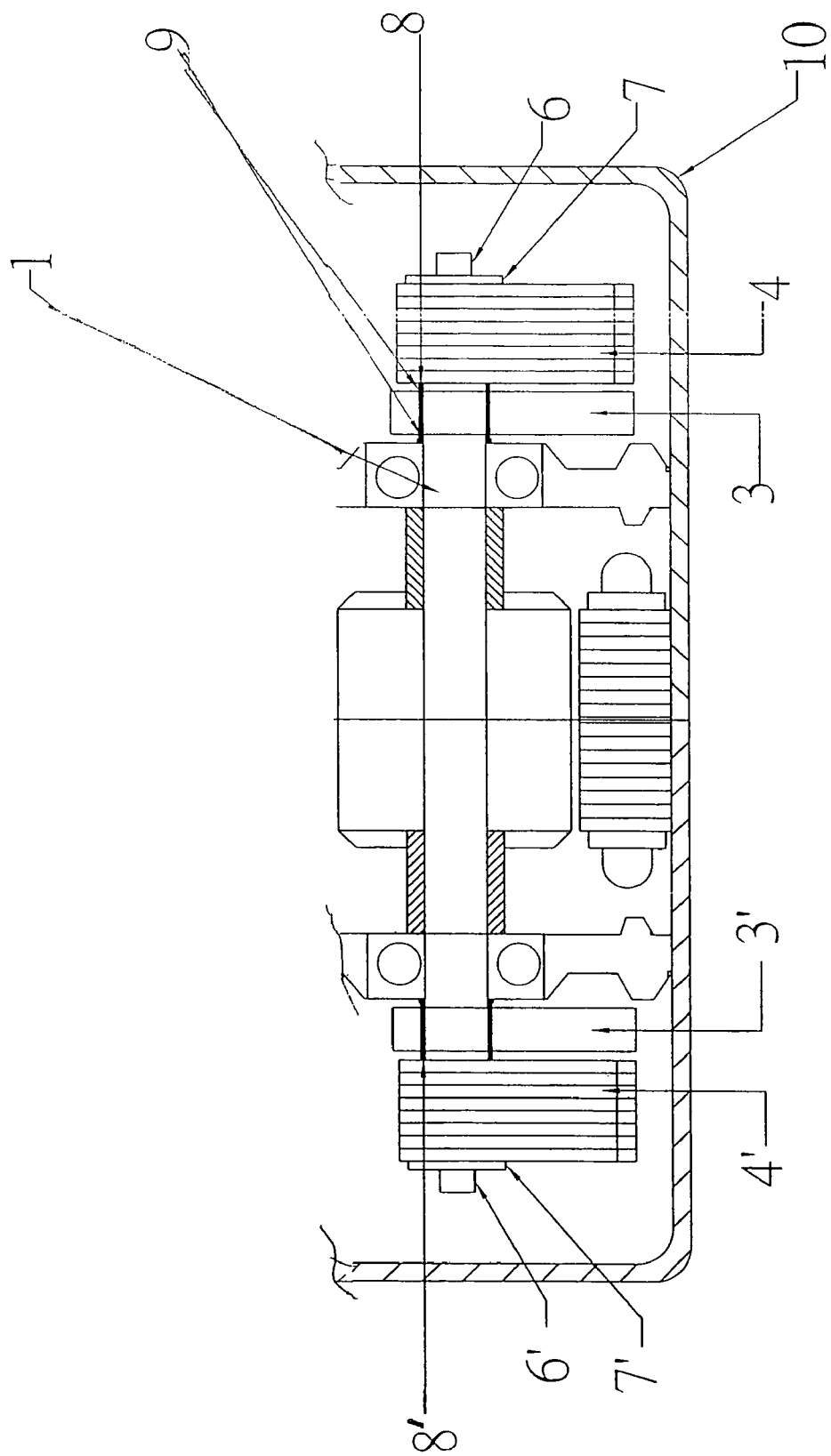

FIG. 1A is an enlarged cross-sectional view of the motor depicted in FIG. 1, but showing details of both sides of the motor and the shaft extending out both sides of the motor.

Figure 2:
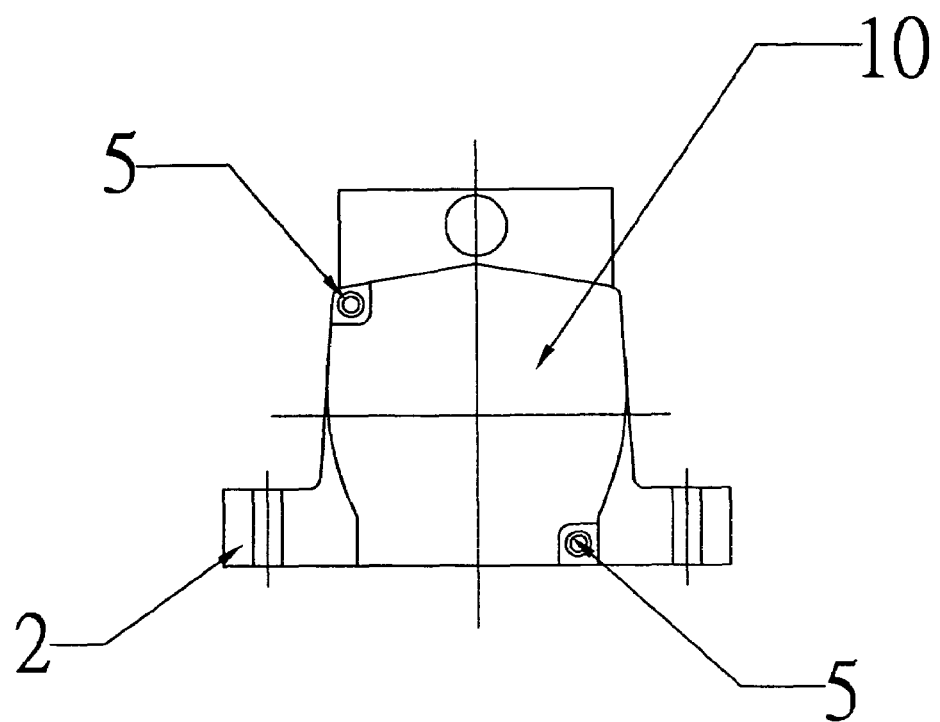
FIG. 2 is a front view of an AC three-phase induction motor.
Figure 3:
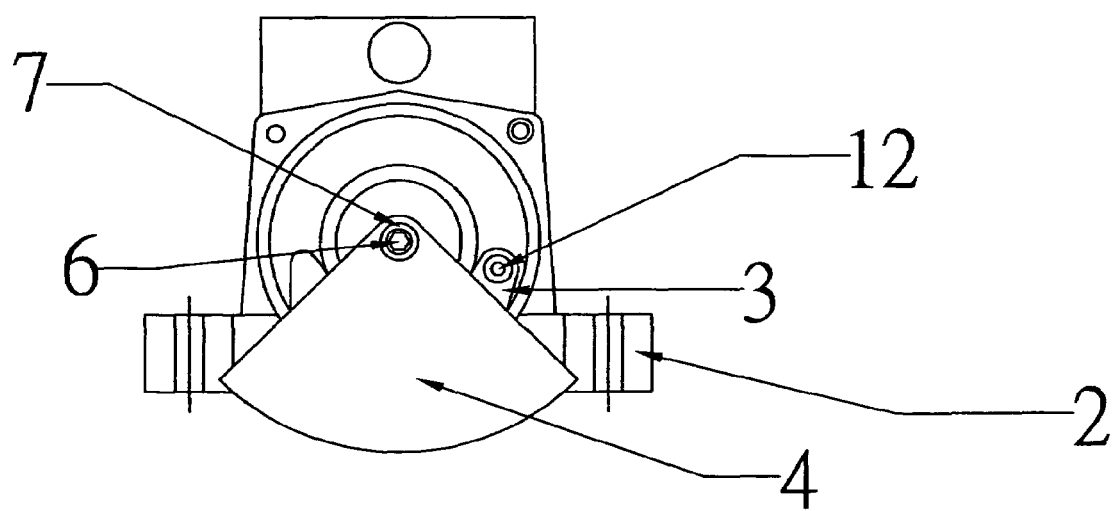
FIG. 3. depicts the structure of higher loading of an AC three-phase induction.
Figure 4:
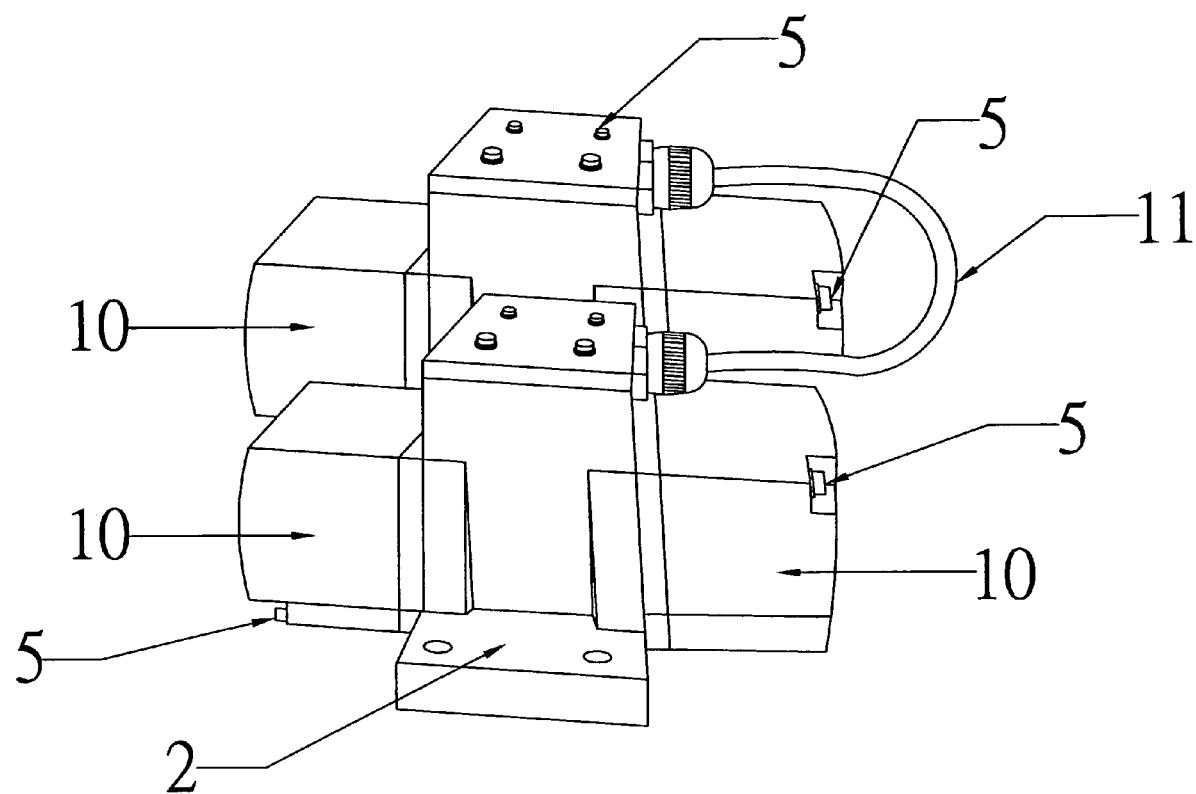
FIG. 4. depicts an alternative, connecting two similar AC motors in series.

With the attached drawings, particularly of FIGS. 1, 1A, 2, 3, 4 and 5, depicting the preferred embodiment the invention proposes, it pertains to an AC three-phase induction motor, wherein the AC three-phase induction motor is comprised of the components of shaft 1 on the two ends of the base element 2, balancing eccentric washers 7, and 7', balancing eccentric blocks 3, and 3', outer closure 10, O-rings 8 and 8', bolts 5, 6, 12, washers 7 and 7', sleeve bearing 9, as shown in FIG. 1, of which the balancing eccentric washers 4 and 4' are of a fan-shaped metal material, the balancing eccentric blocks 3 and 3' are of a specific-configured shape, with one end fitted with bolt 12, which is coated with rubber, and the outer closure 10, as shown in FIG. 2 is made of a metal material, which is used to cover the components of the balancing eccentric washers 4 and 4' and balancing eccentric blocks 3 and 3' on shaft 1.

The AC three-phase induction motor the invention proposes has the extension shaft 1 on two ends embedded with a number of balancing eccentric washers 4, with the balancing eccentric washers on the side of the most outer layer mounted onto the shaft 1 with washers 7 and bolts 6, a balancing eccentric block 3 is mounted onto the shaft 1 of the balancing eccentric washers 4 of the most inner layer, and between the eccentric block 3 and the shaft 1 contains a sleeve bearing 9, and between the most inner layer's balancing eccentric washers 4 and the balancing eccentric block3 contains the O-ring 8.

The AC three-phase induction motor, controlled by a frequency changer, is capable of producing a number of frequencies for generation different amplitudes, and each frequency is capable of generating higher load (FIG. 3) and lower load, wherein under a higher load, the balancing eccentric washers 4 and balancing eccentric block 3 are on the same side, whereas under a lower load, the balancing eccentric washers 4 and balancing eccentric blocks 3 are on different sides, where different amplitudes serve to control the force the balancing eccentric block 3 and balancing eccentric washers 4 spin out, hence enabling the apparatus to achieve the goal of generating different speeds and loads. As an alternative, two similar AC three-phase induction motors can be adopted through serial connection (FIG. 4) with a cable, which can be applied in an exercise device's vibrator among other servos to achieve excelling blood circulation, physical fitness, among other related applications.

While this invention has been particularly shown and described with reference to preferred embodiments thereof, it will be understood by those skilled in the art that various changes in form and details may be made therein without departing from the spirit and scope of the invention as defined by the appended claims.

The invention claimed is:

1. An alternating current (AC) three-phase induction motor comprising:
    extension shafts respectively to two ends of base elements of the three-phase induction motor, wherein said extension shafts respectively include components of balancing eccentric washers, balancing eccentric block, outer shell, O-ring, bolts, washers, and sleeve bearings;
    wherein respective extension shafts on two ends of the AC three phase induction motor are embedded with a pre-determined number of said balancing eccentric washers, and wherein a balancing eccentric block is configured on each of said respective extension shafts at an inner most layer of said balancing eccentric washers, between the eccentric block and said sleeve bearing, and said O-ring is located between an inner most layer of said balancing eccentric washers and said balancing eccentric block;

said AC three-phase induction motor, controlled by a frequency changer, is capable of producing a number of frequencies for generation different amplitudes, and each frequency is capable of generating higher load and lower load, wherein different amplitudes serve to control force for said balancing eccentric block and said balancing eccentric washers spin to achieve a predetermined goal of generating varied speeds and loads;

wherein, for an alternative arrangement of two AC three-phase induction motors, two of said AC three-phase induction motors can be serially connected with a cable.

2. Said AC three-phase induction motor as claimed in claim 1, wherein the higher loading has the balancing eccentric washer and the balancing eccentric block placed on a same side, while the lower loading has the balancing eccentric washer and the balancing eccentric block on two different sides.

3. Said AC three-phase induction motor as claimed in claim 1, wherein the balancing eccentric washer is of a fan-shaped metal material.

4. Said AC three-phase induction motor as claimed in claim 1, wherein the balancing eccentric block is of a predetermined shape, and one end of the balancing eccentric block is fitted with a bolt, and the bolt head is covered with rubber.

5. Said AC three-phase induction motor as claimed in claim 1, wherein the outer shell is made of a metal material, and used to cover the balancing eccentric washer and the balancing eccentric block is on the respective extension shafts.

* * * * *